Oct. 28, 1969     H. GERSON     3,475,105
MARKING INSTRUMENT
Filed Dec. 11, 1967
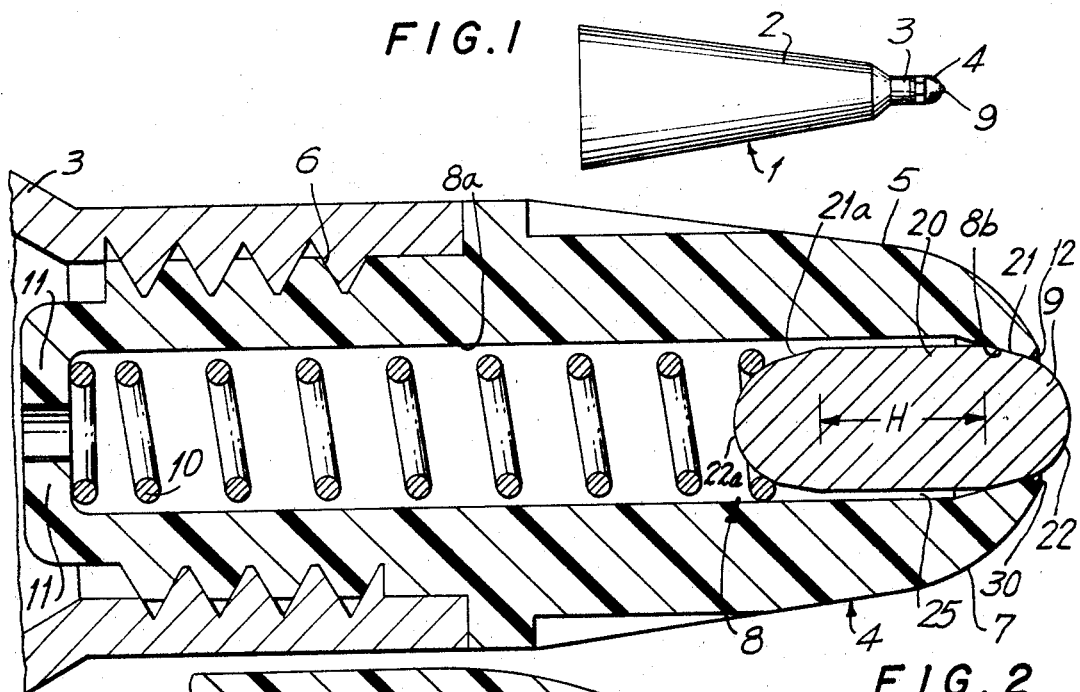
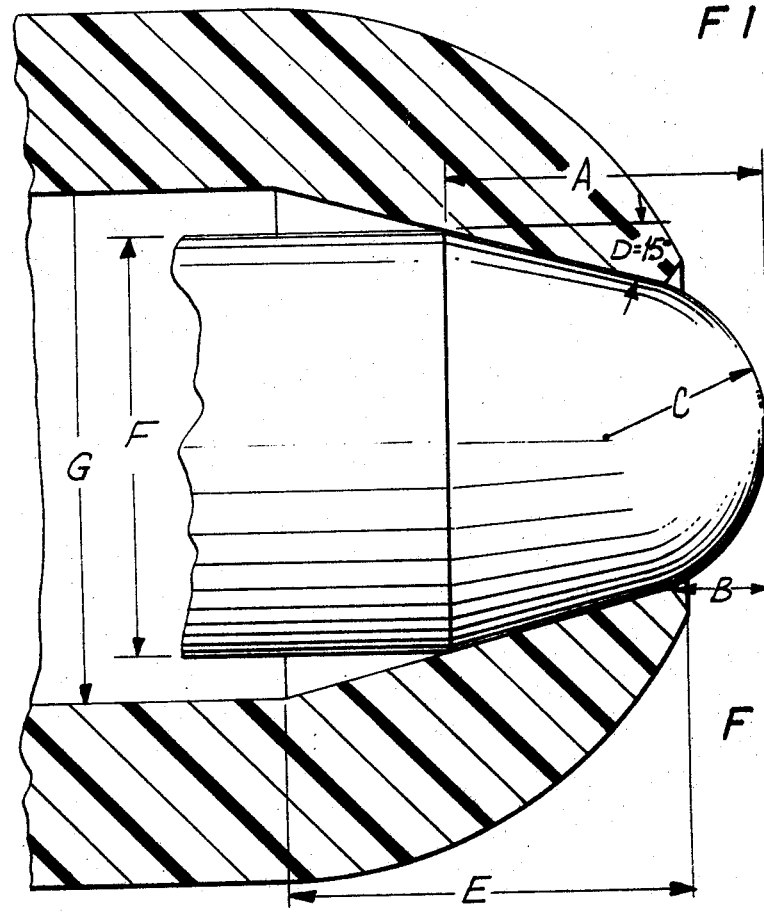

United States Patent Office 3,475,105
Patented Oct. 28, 1969

3,475,105
MARKING INSTRUMENT
Henry Gerson, 345 Cortlandt St.,
Bellville, N.J. 07109
Filed Dec. 11, 1967, Ser. No. 689,667
Int. Cl. B43k 5/02
U.S. Cl. 401—260                                4 Claims

ABSTRACT OF THE DISCLOSURE

A marking instrument having a container for marking fluid and a tip unit on the container for marking a surface, the tip unit including a spring-loaded pin of elongated form housed in a bore of a nipple, the pin and nipple having mutual conical surfaces which are in fluid sealing contact when a spherical portion of the pin projects from the nipple whereby the tip unit is closed. The instrument is operated to mark a surface by moving the instrument along the surface while pressing the spherical portion of the pin against the surface to retract the pin in the nipple and permit fluid to pass from the nipple.

BACKGROUND OF THE INVENTION

Field of the invention

This invention relates to marking instruments and in particular to applicators for liquid waterproof paints used in various colors for painting designs on textiles, for laundry marking, and for writing identifications on various surfaces. Specifically, the invention relates to a novel tip unit adapted to be attached to a flexible tube of liquid paint. The tip unit includes a normally sealed valve, and when the tip unit is pressed lightly against a surface and moved therealong, the valve will open and the tip unit will apply a thin line of paint onto the surface. These point applicators are now used extensively in the liquid embroidering of textiles.

Description of the prior act

Heretofore, it has been common practice to produce a tip unit for a container of liquid paint in which a steel ball of 3/64" diameter is mounted in a bore of a plastic nipple which is secured to the neck of the container. During use, a certain amount of wear takes place on the nipple, and as a consequence the ball has a tendency to pop out of the nipple, rendering the tip unit useless. Efforts in making the nipples of metal material to lessen wear has resulted in increased costs of manufacture as well as operational difficulties which cannot be overcome. These include difficulty in forming a smooth nipple which is free of burrs with the result that the tip unit will not properly seal the paint when the instrument is not in use, whereas also the nipple will tend to scratch the surface when it is being marked. Furthermore, a metal nipple leaves a metallic trace on cloth, which is visible when the paint is a light color and has relatively little covering capability.

The essential problem inherent in the above tip units comes about by the requirement of the spring which acts on the ball to close the nipple. The tension on the spring must be sufficiently high to close the nipple when the instrument is not being used, and at the same time, must not be so high as to prevent normal retraction of the ball within the nipple during use. Thus, the combination of adequate sealing and writing dictates the strength of the spring which in turn acts on the ball to produce wear of the nipple when the instrument is used. A further difficulty encountered with tip units of the above construction is the improper sealing which is produced when the nipple becomes worn. Yet, another problem has been the ease of flow of fluid after the instrument has been out of use for a period of time.

In other previously known tip units the ball has been replaced by members of other shapes. Such members, however, generally rely upon a linear contact with the nipple and consequently the problems of wear inherent in the tip units with balls is also present. Although the shape of the members may be such as to prevent their separation from the nipple when the latter is subjected to wear, nevertheless the wear of the nipple severely affects the operation of the tip unit as regards its sealing function and its ability to produce a smooth even line without skipping or halting. The wear of the nipple also interferes with the capability of the tip unit from producing a line upon the first strokes after the instrument has been out of use, since the paint frequently hardens behind the member as a result of imperfect sealing thereof with the nipple.

SUMMARY OF THE INVENTION

The invention is based on the discovery of a number of essential interrelationships which must be observed between the nipple and a spring-loaded pin member which will permit the nipple to be constructed of plastic material and not be subject to substantial wear by the pin member and whereby the tip unit will have great durability and excellent writing characteristics.

The above is achieved according to the invention by forming the pin member as an enlarged body including a conical portion and a spherical end portion and wherein the nipple has a bore with a conical portion of the same degree of conicity as the conical portion of the pin and a size related thereto, such that the conical portion of the pin member is urged by the spring acting thereon into contact over substantially the entire surface thereof with the conical portion of the bore in the nipple while substantially the entire spherical portion of the tip projects beyond the nipple. Additionally, a further portion on the pin member extends rearwardly from the conical portion into the bore of the nipple to define an extended annular passageway for the flow of marking fluid.

A number of relationships must be carefully observed as between the radius of the spherical portion of the pin member and the length of the conical portion of the pin member in order to achieve the high degree of reliability of the operation of the pin member in the nipple. Specifically, it has been found that the conical portion should have a length about twice that of the spherical portion whereas the radius of the latter should be about two-thirds of the combined length of the conical portion and the spherical portion. When such a configuration of the pin member is employed in a nipple in which the conical portion has a length about the same as the combined length of the conical portion and spherical portion of the pin member, such pin member will bear over a substantial surface area with the nipple and the spherical portion will project substantially in entirety from the nipple in the same manner as a conventional ball. Such a tip unit has a greatly extended life and remains perfectly operable therethroughout. Moreover, such tip units are substantially leak-proof and are particularly effective in writing immediately after having been out of use for a period of time.

BRIEF DESCRIPTION OF THE DRAWING

FIGURE 1 is a side view of a marking instrument according to the invention;

FIGURE 2 is a longitudinal sectional view to an enlarged scale of a tip unit of the marking instrument; and FIGURE 3 is a greatly enlarged view of a portion of FIG. 2 in order to show certain characteristic details thereof.

DESCRIPTION OF THE PREFERRED EMBODIMENT

In the drawing there is seen a marking instrument 1 which is composed of a container 2 for a marking fluid such as a liquid paint, the container having a neck 3 to which is secured a marking tip unit 4.

As seen in FIG. 2, the tip unit 4 includes a nipple 5 of a synthetic resinous plastic material. Preferably, the nipple is a polyamide such as nylon or the like. The nipple 5 has a portion provided with external threads 6 which is threadably engaged in neck 3 to form a liquid-tight engagement of the nipple with the container 2. The nipple has an outer surface 7 which is flush with the outer surface of the neck and which tapers in narrowing fashion to form an end of relatively small size. The nipple has a bore 8 which extends the entire length of the nipple and is open at opposite ends thereof. The bore includes a cylindrical portion 8a and a frustoconical portion 8b, the function of which will be described later. Within the bore 8 there is positioned a pin member 9 composed of steel or other suitably hard material. A spring 10 acts on the pin member 9 and urges the latter into engagement with the frustoconical surface 8b. The spring 10 bears against end abutments 11 formed on the nipple 6. It is to be noted that the assembly of the nipple, pin member and spring forms a self-contained tip unit which is assembled as such in the neck portion of the container.

The pin member is a symmetrical body and includes a central cylindrical portion 20 from which project frustoconical portions 21, 21a carrying respective spherical portions 22, 22a. The spring 10 engages the conical portion 21a of the pin member to urge the conical portion 21 into contacting and sealing engagement with conical surface 8b of the nipple. When the latter conical surfaces are in engagement, the spherical portion 22 projects in entirety from aperture 12 at the end of the bore of the orifice 8. The pin member is in contact with the nipple over a substantial contact area whereby the effects of wear of the nipple are substantially eliminated. Moreover, since the projection of the nipple is achieved solely by the spherical portion 22, the operating characteristics of the tip unit will be similar to the user as the common projecting portion of a ball member. The tip unit according to the invention can be employed at various angles relative to the surface to be marked as with the conventional ball members.

As a consequence of the symmetrical construction of the pin member 9, it may be utilized in either of two positions in the nipple. Moreover, by virtue of its elongated character, when the pin is deposited into the bore it will automatically orient itself into one or the other of its operative positions. Thus, its installation is relatively simple. The symmetrical form of the pin member also results in its ease of manufacture. Of further significance is the fact that the pin member has an elongated shape and includes a rearwardly extending portion from conical part 21, in order to define a passageway 25 between the outer surface of the pin member and the inner surface of bore 8. This passageway becomes filled with paint when the instrument is out of use and upon subsequent first use when the pin member is pressed against the surface to be marked, the paint in passageway 25 will tend to directly flow from the aperture 12 in the bore of the nipple. The flow of paint is facilitated by virtue of the shape of the passageway which is essentially cylindrical with a conically narrowing portion extending towards aperture 12. The flow of paint from the aperture 12 commences when the pin member is retracted into the bore upon contact of spherical portion 22 with the surface to be marked. In operation, the paint, which is under pressure in the tube 2, passes from the storage passageway 25 and flows from the aperture when the pin member is retracted. When the pin member is forced into the bore a conical passageway is produced between the conical surface 8b and 21 through which the paint passes to the surface to be marked.

In order for the tip member and nipple to cooperate to eliminate the wear on the nipple and provide the desired writing function, certain geometrical relationships are critical and must be observed. Reference will next be made to FIG. 3 in explanation of these relationships.

Principally, it is to be noted in FIG. 3 that when the pin is seated in the nipple, the exposed surface of the pin is constituted by the entire spherical surface of the pin member. Thereby, the instrument will have the desirable writing characteristics associated with a spherical tip.

The value of B (the projection of surface 22 from aperture 12) is of great importance in determining the operating characteristics of the instrument, and the value of B is related to C and the diameter of aperture 12. The value of B should be about one-half of C and this relationship must be carefully met if the instrument is to operate properly.

In order to insure a suitable bearing surface of the pin member with the nipple (while providing for a projection of the entire spherical surface of the pin member) the radius of curvature C of spherical surface 22 should be about two-thirds of the combined length of portions 21 and 22 (A). With such a relationship between A, B, C and E there is insured the formation of a graduated elongated passageway between the pin member and the nipple when the pin member is retracted into the nipple during writing. This tends to smoothen the flow of the paint and avoids surges and overflow. The angle D is about 15°. This enables a channeling of the liquid paint towards the aperture 12 along a convergent flow path which aids in the smooth discharge of the paint. The length E of the conical portion of the nipple is equal to the length A of the conical portion and spherical portion of the pin member. Thus, when the pin member is fully retracted in the nipple and production of the thickest lines is desired, the conically narrowing part of the passageway 25 is eliminated since the large base of portion 21 will be in alignment with the base of conical portion 8b. Thereby, the greatest size of opening is afforded for the passage of paint. The diameter F of the pin member and the diameter G of the cylindrical portion 8a of the bore 8 are related in such a way as to provide a particular size for the passageway 25, in order to insure rapid paint outflow when the tip member is retracted. For this purpose, the length H of cylindrical portion 20 should be about five times the difference between G and F. Thereby, a sufficient amount of paint will be stored in passageway 25 to effect rapid outflow when the pin member 9 is retracted into the nipple.

There will next be listed typical values of a tip unit which have been found particularly effective for producing the desired results.

| | |
|---|---|
| A | .035 |
| B | .012 |
| C | .022 |
| D | 15° |
| E | .038 |
| F | .052 |
| G | .062 |
| H | .055 |

In accordance with the above, it has been found that the value of the tension of the spring 10 is of substantial importance in insuring proper sealing contact of the surfaces 21 and 8b while yet permitting proper retraction of pin member 9 and suitable writing characteristics. For such purpose, the spring must have a tension between 100 to 120 grams of force.

In operation, the tip unit is placed against a surface to be marked either vertically upright or at an angle with respect to the surface. The pin member 9 is caused to retract into the bore of the nipple 5 and an inwardly convergent passageway is formed between the pin member and the surface 8b of the nipple through which paint is able to pass around the end of the pin member and onto the surface to be marked. A coined lip 30 is formed on the nipple at aperture 12 and serves as the marking point of the tip unit as the latter is moved along the surface to be marked.

Although the invention has been described hereinabove with respect to a preferred embodiment thereof, it is evident that variations and modifications can be made by those skilled in the art without departing from the spirit and scope of the invention as defined by the following claims.

I claim:

1. A marking instrument comprising a container for a marking fluid, a marking tip unit on said container, said tip unit including a nipple having a first end secured to the container and a second end remote therefrom, said nipple having a bore which opens at both said ends, a pin in said bore, and resilient means acting on the pin to urge the same into contact with the nipple at said second end of the bore, said bore having a conical portion at said second end which widens in a direction towards said first end, said pin being an elongated body and including a conical portion and a spherical end portion directly on the conical portion and merging therewith, said conical portion of the pin having a substantially greater length than that of the spherical portion, said conical portion of the pin having the same degree of conicity as the conical portion of the bore in the nipple and a size related thereto such that said conical portion of the pin is urged by the resilient means into contact, over substantially the entire surface area thereof, with the conical portion of the bore in the nipple while only substantially the entire spherical portion of the tip projects beyond the nipple, said spherical portion having a length which is about one-half the radius of the spherical portion, said pin including a further portion extending from the conical portion into the bore of the nipple to define an annular passageway therewith for the flow of marking fluid, said further portion including a second conical portion and a second spherical end portion symmetrical with the first said conical and spherical portions.

2. An instrument as claimed in claim 1 wherein the pin is steel and the nipple a synthetic resinous plastic material.

3. An instrument as claimed in claim 1 wherein said further portion of the pin comprises a cylindrical portion between the first and second conical portions, said bore having a cylindrical portion extending from the conical portion towards said first end such that said annular passageway is constituted by a cylindrical part between the cylindrical portion of the bore and the cylindrical portion of the pin, and a conical part between the cylindrical portion of the pin and the conical portion of the bore.

4. An instrument as claimed in claim 1 wherein said resilient means is a spring having one end engaged by the nipple and an opposite end in engagement with the second conical portion of the pin.

References Cited

UNITED STATES PATENTS 2,529,554  11/1950  Katzmann _____ 401–259

FOREIGN PATENTS 1,269,299  7/1961  France.
364,808  1/1932  Great Britain.
182,432  4/1936  Switzerland.

LAWRENCE CHARLES, Primary Examiner